(12) United States Patent
Gagnon et al.

(10) Patent No.: US 6,285,880 B1
(45) Date of Patent: Sep. 4, 2001

(54) INTERSYSTEM MESSAGE INDICATOR SPECIFYING MIN OR IMSI USAGE

(75) Inventors: Michel Gagnon; Uzma Abbas, both of Laval; Michel Houde, Ville St-Laurent, all of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/312,551

(22) Filed: May 14, 1999

(51) Int. Cl.$^7$ ....................................................... H04Q 7/20
(52) U.S. Cl. ........................ 455/432; 455/435; 455/436; 455/439; 455/433; 455/458
(58) Field of Search .................................. 455/426, 432, 455/433, 434, 435, 436, 438, 439, 445, 448, 462, 465, 551, 552, 553, 405, 406, 408, 422, 458, 560

(56) References Cited

U.S. PATENT DOCUMENTS

| | | | |
|---|---|---|---|
| 5,699,408 | 12/1997 | Krolopp et al. | 375/59 |
| 6,081,705 | * 6/2000 | Houde et al. | 455/411 |

FOREIGN PATENT DOCUMENTS

WO 97/47146  12/1997  (WO).
WO 98/35521  8/1998  (WO).
WO 00/08888  2/2000  (WO).

OTHER PUBLICATIONS

PCT, International Search Report for PCT/SE00/00818, Oct. 31, 2000.

* cited by examiner

Primary Examiner—Nay Maung
Assistant Examiner—Ray Persino
(74) Attorney, Agent, or Firm—Jenkens & Gilchrist, P.C.

(57) ABSTRACT

A system and method for conveying data in an inter-exchange message, said data identifying a selected one of a plurality of mobile station identifiers to be used in connection with a particular mobile station. The mobile station selects said mobile station identifier prior to registering with a first mobile switching center. Subsequently, the mobile station moves into an area served by a second mobile switching center. An inter-exchange message containing information about the mobile station is then sent from the first mobile switching center to the second mobile switching center. The information includes the plurality of mobile station identifiers and an indication of which one of the identifiers has been selected for use by the mobile station. The selected identifier can then be extracted from the inter-exchange message and used by the second mobile switching center for paging the mobile station, for compiling statistics relating to the mobile station, or for other purposes in implementing the mobile telecommunications system.

21 Claims, 3 Drawing Sheets

INTERSYSTEM MESSAGE INDICATOR SPECIFYING MIN OR IMSI USAGE

BACKGROUND OF THE INVENTION

1. Technical Field of the Invention

The present invention relates in general to the exchange of information between systems in a mobile telecommunications network, and in particular to the exchange of identification information for mobile stations in mobile telecommunications systems.

2. Description of Related Art

To handle large numbers of subscriber stations in a mobile telecommunications network, the network must be able to conveniently distinguish between each of the various subscriber stations. Accordingly, each mobile station has an associated unique identification number that is used to identify the particular mobile station. Under the ANSI-41 standard, for example, each mobile station is assigned a unique Mobile Identification Number (MIN). The mobile station's MIN is included in virtually all signaling messages that are sent between nodes within the network or over the air interface to identify the mobile station. A problem with use of the MIN, however, is that it is only unique within a particular numbering plan. In other words, a mobile station operating in North American might have a MIN that is identical to a different mobile station that is operating in Europe. As a result, mobile stations using only the MIN for identification cannot generally roam in areas that use a different numbering plan because of the potential for conflicts with native mobile stations that may be using identical MINs.

A second identifier that can be used is the International Mobile Station Identifier (IMSI). Unlike the MIN, the IMSI is unique internationally. Thus, a mobile station that is identified by an IMSI can roam worldwide, assuming that the mobile station is otherwise capable of operating in the particular foreign country at issue.

Until recently, the ANSI-41 standard only provided for use of the MIN to identify the mobile station in transmitted messages. As a result, mobile stations that operated in accordance with the ANSI-41 standard could not typically roam outside of North America. Pursuant to IS-751, however, ANSI-41-D now supports the use of the IMSI for mobile station identification in addition to the MIN. This additional capability impacts virtually all messages that are sent in a mobile telecommunications network because nearly every message can now contain either or both a MIN and an IMSI for each mobile station (provided the mobile station at issue is assigned both a MIN and IMSI). Thus, in the case of an InterSystemPage message, for example, or in other cases where more than one mobile switching center (MSC) is involved in routing a message, IS-751 supports use of both the MIN and the IMSI to identify the mobile station.

Although both identifiers are transported, only one of the two identifiers is actually used by the network and the mobile station at any given time. IS-751 does not provide the system with a means for identifying a particular one of the identifiers to be used. Similarly, IS-751 does not provide a means for identifying an identifier that has previously been used in communicating with the mobile station. Such information might be helpful in some situations to ensure proper system operation. There is a need, therefore, for a method and system for selecting which one of a plurality of mobile station identifiers should be used in connection with transmitted network messages or network transactions or operations relating to a mobile station.

SUMMARY OF THE INVENTION

The present invention comprises a method and system for communicating data identifying a selected one of a plurality of mobile station identifiers to be used in connection with transmitted network messages or network transactions or operations relating to a particular mobile station. Just prior to registering with a first mobile switching center, the mobile station selects an appropriate one of its plurality of identifiers for use in communicating with the first mobile switching center. For example, the mobile station selects between its associated Mobile Identification Number and its associated International Mobile Station Identifier based on, for example, a previously received mobile country code or system identifier or a determination that the first mobile switching center does not support one type of mobile station identifier. The mobile station then registers with the first mobile switching center using the selected identifier, and the first mobile switching center stores the selected identifier for subsequent use in communicating with the mobile station.

At some later time, the mobile station moves into an area served by a second mobile switching center. In connection with an attempt to page the mobile station, or in connection with a transfer of control over the mobile station to the second mobile switching center, the first mobile switching center sends an inter-exchange message to the second mobile switching center. The inter-exchange message includes the plurality of identifiers as well as an indication of which one of the identifiers was selected for use in the first mobile switching center. The second mobile switching center extracts this information and stores the selected identifier or the indication of which identifier has been selected in a database associated with the second mobile switching center. The second mobile switching center can then utilize the selected identifier to page the mobile station or to otherwise communicate with the mobile station.

In addition, the second mobile switching center can also use the selected identifier for compiling statistics involving the mobile station or for implementing certain functions with the mobile radio network.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
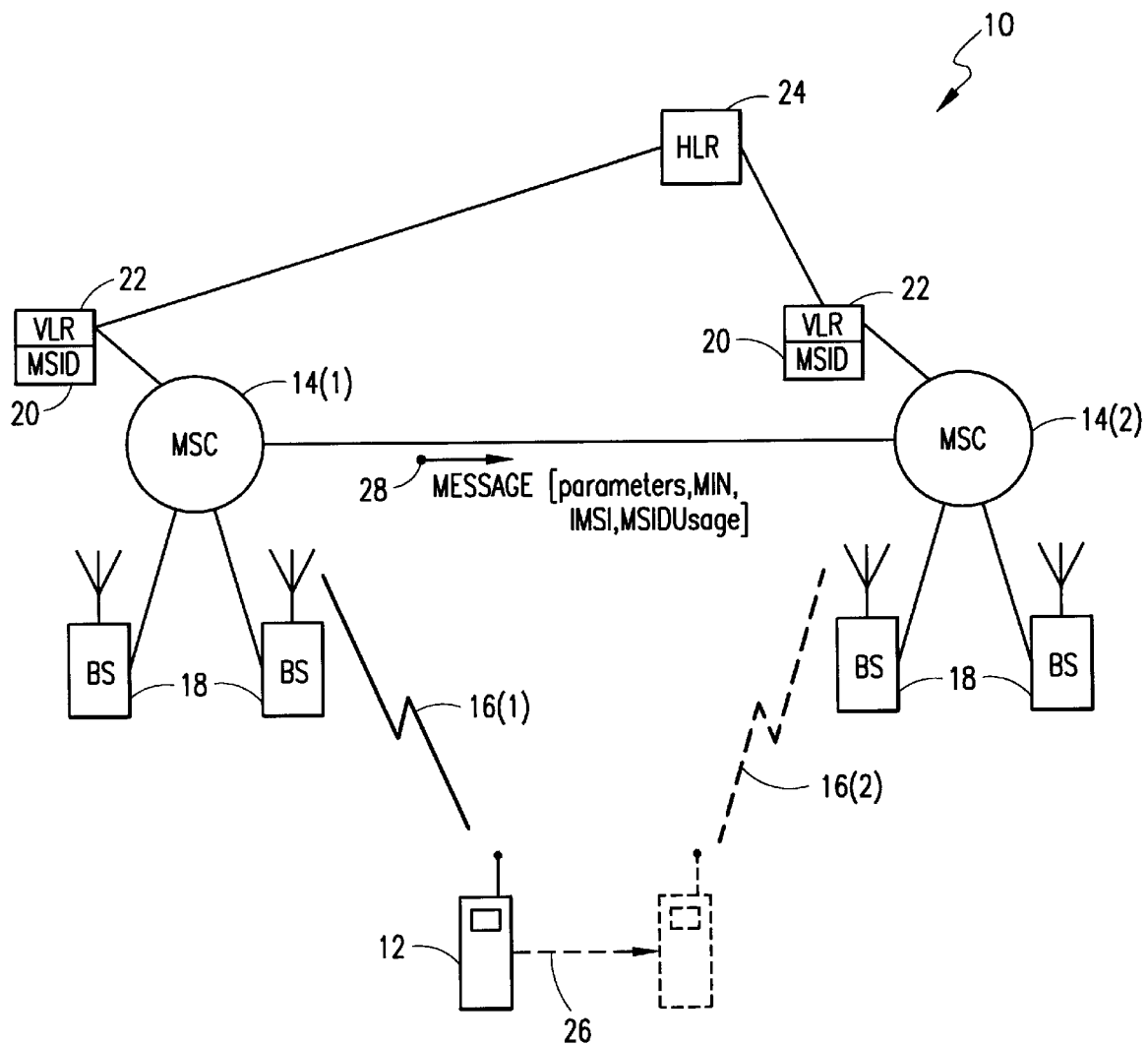
FIG. 1 is a block diagram of a mobile telecommunications system which implements the present invention.

In accordance with IS-751, serving mobile switching centers (MSCs) and other originating nodes in mobile telecommunications systems operating under ANSI-41-D have the ability to identify a particular mobile station using either of two different mobile station identifiers (MSIDs): the International Mobile Station Identifier (IMSI) and the Mobile Identification Number (MIN). Similarly, target MSCs, border MSCs, or other receiving nodes (e.g., MSCs in another country) have the ability to receive both the IMSI and the MIN for each mobile station. Generally, however, only one of the two identifiers is used by the system and/or the mobile station at any given time. In some cases, a target MSC might need to know which identifier to use, for purposes of conducting communications with the mobile station, maintaining radio statistics, or implementing certain functions within the mobile radio network.

Which one of the two identifiers is used by the system (and by the mobile station) is primarily dependent upon the implementation of the system. When the mobile station is first turned on in an area served by an MSC or exchange, or when the mobile station first enters an area served by a particular MSC or exchange, the mobile station must register with the system before it can initiate or receive calls or send or receive data. The mobile station, however, must register with the system using only one of its identifiers.

In a typical mobile telecommunications system, a system identifier is constantly broadcast. In addition to the system identifier, or as an alternative, the system might also broadcast a mobile country code (MCC) associated with the country in which the MSC is located. As an additional alternative, the system can broadcast on a control channel an indication of which identifier is required or preferred by the MSC for use when the mobile station accesses the system. Before registering, the mobile station monitors a control channel to receive the system identifier, the mobile country code information, and/or the indication of which identifier is required or preferred. Based on this information, the mobile station selects which identifier or MSID that it will use. Of course, if the mobile station is only capable of using one type of identifier (e.g., the MIN), the mobile station will use that identifier even if such information indicates a preference for a different identifier. For example, if the mobile station determines that it is in its designated "home" country, the mobile station will select its associated MIN for use in communicating with the system. On the other hand, if the mobile station determines that it is currently located in a foreign country, it will select its associated IMSI for use in communicating with the system. The selected identifier is then included as part of the registration message. After the mobile station registers with the system, the serving MSC stores the identifier that is received from the mobile station and uses that particular identifier for all subsequent communications or calculations involving the mobile station (at least until the mobile station registers with a new identifier). In addition, the system might also retrieve and store the other identifier from the mobile station's home location register (HLR) although such identifier is not actually used to communicate with the mobile station. Furthermore, a typical mobile telecommunications system supports a plurality of different control channels within a cell, in the context of multiple digital control channels for exchanging control data with mobile stations. Each individual mobile station, however, communicates with the system using only a selected one of the plurality of control channels. Thus, when the mobile station registers with a particular MSC or exchange, the mobile station must select among several available control channels in a given cell. To identify which control channel is appropriate, the mobile station performs a calculation using the MSID (e.g., the MIN or IMSI) which is selected as described above, and some other parameters. As a result, the choice of a control channel to be used in the context of multiple control channels within a cell is frequently dependent upon which MSID (either the MIN or the IMSI) has been selected.

Once the appropriate control channel is identified, the mobile station uses the identified control channel for all subsequent communications with the system (at least until the mobile station selects a new control channel). For control messages that originate in the system and that are directed to the mobile station, the serving MSC performs similar calculations (i.e., based on the MSID) to determine which control channel to use. For example, when a mobile station first enters an area served by a particular MSC, the mobile station performs a calculation using its selected MSID (e.g., its associated MIN) and determines that, in this particular example, it should use control channel number five. All control information that is subsequently sent from the mobile station to the system is transmitted on control channel number five. Similarly, all control information that is sent from the system to the mobile station is also transmitted on control channel number five.

A problem can arise, however, when the mobile station moves into an area served by a different MSC, regardless of whether the mobile station is involved in a call. Pursuant to IS-751, the new MSC is capable of receiving both identifiers (i.e., the MIN and the IMSI) from the original serving MSC, but the new MSC does not know which identifier has previously been selected for use in communicating with the mobile station. Thus, the new MSC does not know which control channel to use for purposes of transmitting control information to the mobile station or for calculating statistics involving the mobile station.

Referring now to FIG. 1, there is illustrated a mobile telecommunications system 10 for implementing the present invention. Initially, a mobile station 12 registers in a first MSC 14(1) by sending a registration message over an air interface 16(1) to a base station 18 that is associated with the first MSC 14 (1). The registration message contains a mobile station identifier and is sent over a particular one of a plurality of control channels calculated according to the mobile station's identifier. Thereafter, the mobile station 12 monitors only the selected control channel for messages from the system 10. Accordingly, the first, or serving, MSC 14(1) stores the MSID (as indicated at 20) in an associated visitor location register (VLR) 22, so that the serving MSC 14(1) is subsequently able to determine which MSID to use for communicating with the mobile station 12 and for performing calculations involving the mobile station 12. Other information or parameters for the mobile station 12 can also be retrieved from an HLR 24 associated with the mobile station 12 and sent to the VLR 22.

Subsequently, the mobile station 12 travels (as indicated at 26) into an area served by a border MSC 14(2), or by some other MSC 14 that does not border on the serving MSC 14(1). The mobile station 12 can then communicate with a base station 18 of the border MSC 14(2) over an air interface 16(2). In most cases, however, the mobile station 12 cannot communicate with the border MSC 14(2) until the border MSC(2) is actually aware of the mobile station's presence in the area either through registration or handoff procedures. In accordance with ordinary operating procedures, the mobile station 12 automatically performs a periodic registration. Thus, when the mobile station 12 moves into the area served by the new MSC 14(2), it will eventually register with the new MSC 14(2) because of the periodic registration. Until such registration, the mobile station will continue to use the same MSID as was used in the original MSC 14(1), although the new MSC 14(2) does not typically have a way to know which MSID is being used by the mobile station until the registration occurs. In addition, the mobile station 12 can also be programmed to perform a forced registration when the mobile station 12 realizes that it is in a new area (i.e., when the mobile station 12 receives a new system identification number (SID) over a control channel).

In accordance with either the periodic registration or the forced registration, the mobile station 12 will eventually register with the new MSC 14(2) using a selected one of its MSIDs on a control channel that is calculated from the selected MSID (as discussed above). There is a window of time, however, in which the mobile station 12 is located in the area served by the second MSC 14(2) but has not yet registered with the second MSC 14(2). In some cases, it might be useful for the second MSC 14(2) to know during this window of time whether the MIN or the IMSI was used by the original MSC 14(1) for communications or calculations involving the mobile station 12. For instance, the second MSC 14(2) might need to page the mobile station. In such a case, the second MSC 14(2) needs to know which MSID to use for digital control channel selection and slot assignment to page the mobile station 12.

In addition, even outside of the time window before registration in the second MSC 14(2) occurs, the second MSC 14(2) might also need to know which MSID was used by the mobile station 12 in communicating with the original MSC 14(1) for purposes of maintaining accurate statistics involving the mobile station 12 or for other possible system implementation issues. This is because the MSID selected for use in the second MSC 14(2) can, in some cases, be different from the MSID selected for use in the first MSC 14(1).

Therefore, in accordance with the present invention, interexchange communications include an "MSIDUsage" parameter that indicates which MSID has been used by the first MSC 14(1) or, alternatively, which MSID should be used by the second MSC 14(2). Accordingly, messages 28 that relate to a specific mobile station 12 and that are sent between different MSCs 14 include that mobile station's MIN and IMSI and an "MSIDUsage" parameter indicating which MSID (i.e., the MIN or the IMSI) should be used, in addition to other parameters that are appropriate for the particular message 28. As a result, the second MSC 14(2) is able to select which MSID to use in connection with the mobile station 12 and can store such information (as indicated at 20) in the VLR 22. Preferably, the "MSIDUsage" parameter includes a first preselected number of bits that identify the parameter as the "MSIDUsage" parameter, a second preselected number of bits that indicate the length of the parameter, and a third set of bits that are used to transport data (i.e., indicating which MSID is used).

Figure 2:
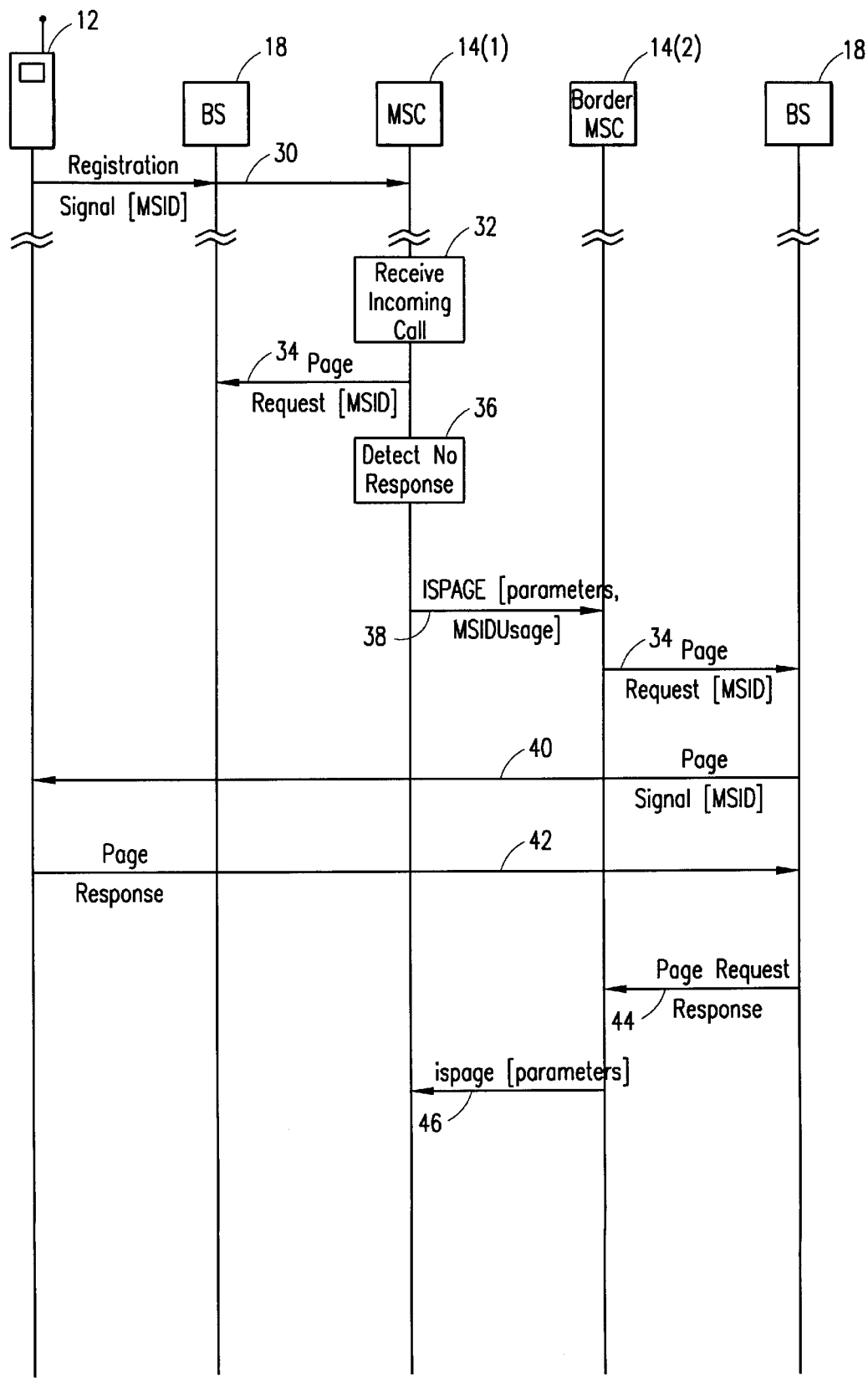
FIG. 2 is a timing and message flow diagram illustrating an implementation of the present invention in connection with an Intersystem Page message transaction.

Referring now to FIG. 2, there is shown a timing and message flow diagram illustrating the operation of the present invention in connection with an Intersystem Page. Initially, the mobile station 12 sends a registration signal 30 to the serving MSC 14(1) via a nearby base station 18. The registration signal 30 includes a selected MSID (or both MSIDs along with an indication of which one to use) for the mobile station 12, in addition to other data that is useful or necessary for registration. As discussed above, the MSID is selected from the two or more available MSIDs according to the system identifier and/or the mobile country code previously received by the mobile station 12 in a downlink control signal (not shown). Moreover, the registration signal 30 is sent on a particular uplink control channel according to a calculation performed using the selected MSID.

At some later time, the serving MSC 14(1) receives an incoming call that is directed to the mobile station 12 (at step 32). As a result, the serving MSC 14(1) sends a page request signal 34 to one or more base stations 18 served by the MSC 14(1), which each broadcast a page signal using the previously selected MSID for the mobile station 12 (i.e., the MSID included in the registration signal 30), at least until the mobile station re-registers in accordance with the periodic registration procedures, at which time a different MSID might be selected. If the mobile station 12 receives the page, it will respond, and the serving MSC 14(1) will be able to connect the incoming call with the mobile station 12. In this case, however, it is assumed that the mobile station 12 does not respond to the page because the mobile station 12 has moved out of the area served by the serving MSC 14(1) and into an area that is served by a border MSC 14(2). Accordingly, after a predetermined period in which no response is received, the serving MSC 14(1) concludes, at step 36, that the mobile station 12 is no longer located in the area of the serving MSC 14(1).

The serving MSC 14(1) must then attempt to locate the mobile station 12 in some other area. Because the mobile station 12 periodically re-registers as it moves, it can be assumed that the mobile station 12 has not traveled very far since its last registration 30. Thus, the serving MSC 14(1) sends an "InterSystemPage" message 38 ("ISPAGE") to at least one border MSC 14(2). As an alternative, the "InterSystemPage" message 38 can also be sent at the same time as the intra-system page from the first MSC 14(1).

The "InterSystemPage" message 38 is used to request that the border MSC 14(2) page the mobile station 12. The "InterSystemPage" message 38 contains a number of parameters, including both the MIN and the IMSI in accordance with IS-751. To successfully page the mobile station 12, the border MSC 14(2) must transmit a page request 34 using the correct MSID in order to calculate the appropriate digital control channel and slot assignment. This is because the mobile station 12 only monitors the control channel that was calculated with the MSID that the mobile station 12 last successfully registered with in the serving MSC 14(1), at least until the mobile station 12 performs the next periodic registration, at which time a different MSID might be used. If the page is broadcast on a control channel other than the one being monitored by the mobile station 12, then the mobile station 12 will not receive the page request 34. To determine which control channel to use, the border MSC 14(2) must perform the same type of calculation as was performed by the mobile station 12 when it last registered with the first (serving) MSC 14(1). If the border MSC 14(2) uses the wrong MSID (i.e., an MSID that is not currently being used by the mobile station 12) to calculate the control channel, the wrong control channel will likely be selected and the mobile station 12 will not receive the page.

Accordingly, the "InterSystemPage" message 38 includes an "MSIDUsage" parameter that specifies which MSID (the MIN or the IMSI) is currently being used by the mobile station 12. If the "InterSystemPage" message 38 is received before the mobile station 12 registers in the border MSC 14(2), the border MSC 14(2) examines the data in the "MSIDUsage" parameter to determine which MSID to use in replicating the control channel calculation previously performed by the mobile station 12. Once the control channel is calculated, the border MSC 14(2) sends a page request 34 to one or more base stations 18. The base stations 18 in turn broadcast a page signal 40 containing the appropriate MSID over the calculated control channel. Upon receiving the page signal 40, the mobile station 12 sends a page response 42 over the control channel to a nearby base station 18, which forwards the response to the border MSC 14(2) in a page request response 44. The border MSC 14(2) then sends an "InterSystemPageResponse" (ispage) 46 to the original serving MSC 14(1) for purposes of indicating that the page was successful. The incoming call can then be forwarded to the border MSC 14(2) so that a call connection with the mobile station 12 can be established.

Figure 3:
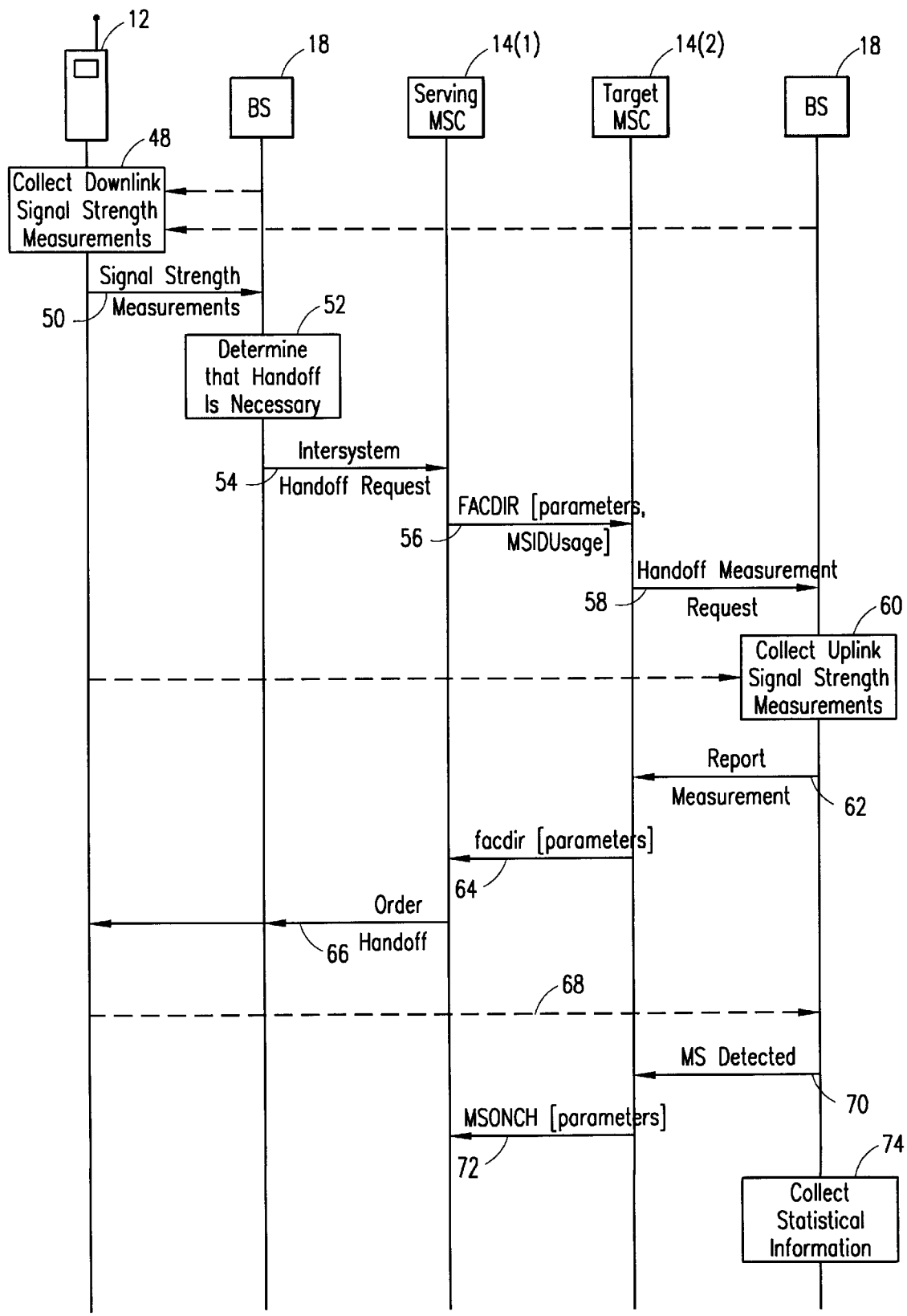
FIG. 3 is a timing and message flow diagram illustrating an implementation of the present invention in connection with an inter-exchange hand-off.

In addition to using the "MSIDUsage" parameter for performing inter-system page operations, the parameter can also be used in other inter-system or inter-exchange messages. Referring now to FIG. 3, there is shown a timing and message flow diagram illustrating the operation of the present invention in connection with an inter-exchange hand-off. During ongoing calls, a mobile station 12 is constantly collecting downlink signal strength measurements (as indicated at 48) from the currently serving base station 18 as well as other neighboring base stations 18. When the mobile station 12 is near the edge of an area served by the currently serving MSC 14(1), the neighboring base stations 18 might include base stations 18 that are controlled by a different MSC 14(2).

The mobile station 12 periodically sends these downlink signal strength measurements to the currently serving base station 18 (as indicated at 50). Based on a comparison among the received measurements, the base station 18 may determine (as indicated at 52) that a mobile station hand-off is necessary. Here, it is assumed that the base station 18 determines that a hand-off to a base station 18 in a different exchange (a target MSC 14(2)) is necessary. As a result, the base station 18 sends an intersystem hand-off request 54 to the serving MSC 14(1). The serving MSC 14(1) in turn sends a "FacilitiesDirective" message (FACDIR) 56 to the target MSC 14(2). In accordance with the present invention, however, the "FacilitiesDirective" message 56 includes an "MSIDUsage" parameter that allows the target MSC 14(2) to know which MSID has previously been used by the mobile station 12 in communicating with the original serving MSC 14(1). As discussed below, this can be useful in collecting statistical information, for maintaining accurate charging records, or for implementing functions within the system.

Subsequently, the hand-off procedure proceeds in a typical fashion. In particular, the target MSC 14(2) sends a handoff measurement request 58 to at least one base station 18 that is a candidate for the handoff. The candidate base station 18 then collects uplink signal strength measurements from the mobile station 12 (as indicated at 60) and reports the measurements to the target MSC 14(2) (as indicated at 62) to confirm that the mobile station 12 is within range of the candidate base station 18. The target MSC 14(2) sends a "FacilitiesDirectiveResponse" message 64 ("FACDIR") to the serving MSC 14(1), which orders the mobile station 12 to handoff to the target base station 18 (as indicated at 66). Once the mobile station 12 is in communication with the target base station 18 (as indicated at 68), the base station 18 sends a message to the target MSC 14(2) indicating that the mobile station 12 has been detected. Finally, the target MSC 14(2) sends a mobile station on channel message 72 ("MSONCH") to the original serving MSC 14(1) indicating that the mobile station 12 has successfully handed off to the target base station 18, so that the call can be released by the original serving MSC 14(1).

Because the inter-exchange message 56 includes the "MSIDUsage" parameter, the target MSC 14(2) is able to collect statistical information (as indicated at 74) for the mobile station 12 using the same MSID that had previously been used by the original MSC 14(1). This functionality permits the overall telecommunications system 10 to more accurately and efficiently collect mobile radio statistics. These statistics can be used at the system level for a variety of purposes, such as to keep track of the number of hand-offs that occur from one MSC 14 to another or to help build a better system topology in the future. The target MSC 14(2) might also need to use the same MSID as the originating MSC 14(1) so that accurate charging records can be kept by the mobile telecommunications system 10. In addition, a target MSC's knowledge of which MSID has previously been used might also be useful for other implementation purposes.

Although the illustrations of situations in which the "MSIDUsage" parameter is used are limited to the transmission of an Inter-system Page and an Inter-system Handoff, it will be appreciated that the "MSIDUsage" can also be included in virtually any hand-off related message that is transmitted within the system 10. Other inter-exchange messages that might contain the "MSIDUsage" parameter include, for example, a "HandoffBack" message, a "HandoffToThird" message, an "InterSystemAnswer" message, an "InterSystemSetup" message, an "SMSDeliveryForward" message, or an "SMSDeliveryBackward" message.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for identifying which one of a plurality of mobile station identifiers is to be used in connection with a specified mobile station in a multi-exchange mobile telecommunications network, comprising the steps of:
   registering the mobile station in a first exchange;
   sending an inter-exchange signaling message associated with the mobile station from the first exchange to a second exchange, said inter-exchange signaling message including the plurality of mobile station identifiers and an indication of which one of the plurality of mobile station identifiers is to be used in connection with the mobile station; and
   selecting at the second exchange the particular one of the plurality of mobile station identifiers for use by the second exchange in connection with the mobile station, said selection made in accordance with the indication included in the inter-exchange signaling message.

2. The method of claim 1, wherein the step of registering includes the step of sending said particular mobile station identifier from the mobile station to the first exchange.

3. The method of claim 2, further comprising the step of storing said particular mobile station identifier in the first exchange.

4. The method of claim 1, wherein the inter-exchange signaling message associated with the mobile station comprises an inter-exchange page message.

5. The method of claim 4, further comprising the step of sending the inter-exchange page message to the second exchange in response to a determination that the mobile station has not responded to a page request issued by the first exchange.

6. The method of claim 1, wherein the inter-exchange signaling message associated with the mobile station comprises a handoff message.

7. The method of claim 1, further comprising the step of storing said particular mobile station identifier in the second exchange.

8. The method of claim 7, further comprising the step of collecting radio statistics at the second exchange using said particular mobile station identifier.

9. The method of claim 1, wherein the plurality of mobile station identifiers includes a Mobile Identification Number (MIN).

10. The method of claim 1, wherein the plurality of mobile station identifiers includes an International Mobile Station Identifier (IMSI).

11. A mobile telecommunications system, comprising:
a first mobile switching center storing an indication of a particular one of a plurality of identifiers associated with a registered mobile station, said particular identifier to be used in connection with the mobile station, wherein the first mobile switching center operates to send an inter-exchange message containing said plurality of identifiers and containing said indication; and
a second mobile switching center receiving said inter-exchange message and retrieving said indication to determine which one of the plurality of identifiers to use in connection with the mobile station.

12. The mobile telecommunications system of claim 11, further comprising a visitor location register associated with the first mobile switching center for storing said indication.

13. The mobile telecommunications system of claim 11, further comprising a visitor location register associated with the second mobile switching center for storing said indication.

14. The mobile telecommunications system of claim 11 wherein the plurality of identifiers include a Mobile Identification Number (MIN) and an International Mobile Station Identifier (IMSI).

15. The mobile telecommunications system of claim 11 wherein the inter-exchange message comprises a page request.

16. The mobile telecommunications system of claim 11 wherein the inter-exchange message comprises a handoff request.

17. A method for identifying a selected one of a plurality of mobile station identifiers to be used in connection with an inter-system page, comprising the steps of:

registering a mobile station in a first mobile telecommunications exchange using said selected identifier;
sending an inter-system page message from the first exchange to a second exchange, wherein said inter-system page message includes said plurality of mobile station identifiers and an indication of the selected identifier; and
using the selected identifier at the second exchange to page the mobile station.

18. The method of claim 17 further comprising the step of receiving at said first exchange an incoming call directed to said mobile station, wherein the step of sending an inter-system page is responsive to said incoming call.

19. The method of claim 17 wherein the step of using the selected identifier to page the mobile station comprises the step of calculating an appropriate control channel for paging the mobile station using the selected identifier.

20. A method for identifying a selected one of a plurality of mobile station identifiers to be used for a particular mobile station, comprising the steps of:

determining that an inter-exchange handoff from a first exchange to a second exchange for the particular mobile station is necessary;
sending a handoff request from the first exchange to the second exchange, said handoff request including said plurality of mobile station identifiers and an indication of the selected identifier; and
storing the selected identifier at the second exchange for use in connection with the mobile station.

21. The method of claim 20 further comprising the step of using the selected identifier for compiling statistics relating to the particular mobile station.

* * * * *